United States Patent [19]

James

[11] 4,422,126
[45] Dec. 20, 1983

[54] NONINDUCTIVE ELECTRICAL CAPACITOR

[75] Inventor: Stephen A. James, Hennepin County, Minn.

[73] Assignee: Honeywell Inc., Minneapolis, Minn.

[21] Appl. No.: 398,180

[22] Filed: Jul. 14, 1982

[51] Int. Cl.³ .................. H01G 4/08; H01G 13/00
[52] U.S. Cl. ................................ 361/323; 29/25.42
[58] Field of Search ............ 29/25.42; 361/271, 272, 361/297, 275, 321–324, 306, 301, 308, 313, 309

[56] References Cited

U.S. PATENT DOCUMENTS

| | | | |
|---|---|---|---|
| 1,952,925 | 11/1932 | Kopinski | 29/25.42 X |
| 2,858,492 | 10/1958 | Lamphier | 29/25.42 X |
| 3,024,394 | 1/1958 | Salisbury | 361/307 |
| 3,229,174 | 1/1966 | Marchewka | 29/25.42 X |
| 3,519,902 | 7/1970 | Morozovsky | 361/272 X |
| 3,715,784 | 2/1973 | Rayburn | 29/25.42 |
| 4,166,285 | 8/1979 | Bauer et al. | 361/307 |
| 4,173,033 | 10/1979 | Sako et al. | 361/323 |

Primary Examiner—Donald A. Griffin
Attorney, Agent, or Firm—George W. Field

[57] ABSTRACT

A method of making a convolutely wound electrical capacitor which comprises performing half the winding in a first direction, then reversing the direction and completing the winding without allowing the first winding to unwind.

5 Claims, 2 Drawing Figures

NONINDUCTIVE ELECTRICAL CAPACITOR

TECHNICAL FIELD

This invention relates to the field of electrical engineering, and particularly to the design and construction of "wound" electrical capacitors.

BACKGROUND OF THE INVENTION

A typical wound capacitor comprises a plurality of wound layers of dielectric material having deposited metal strips on first surfaces. First ends of one engaging the metal of the other, and are then wound about a mandrel so that the metalic strips comprise a convoluted electrical capacitor. Nonmetalized margins are provided along one edge of each winding, and are oppositely arranged so that metalizations of the two wound layers come to opposite ends of the wound capacitor. After winding, the ends of the layers are fastened and metalic connections are made to the ends, to give electrical connection to the capacitor electrodes. Impregnation, hermetic sealing, and related refinements may be added as desired.

One of the undesirable characteristics of wound capacitors is that by reason of their winding, they prossess not only the intended capacitance, but also an unintended inductance, which acts electrically to oppose the capacitance, and at high frequencies may so reduce the effective capacitance that it is no longer a functional capacitor. This invention provides for extended frequency applications for any given value of a wound capacitor, and also provides for a more "pure" capacitance by minimizing the inductive element, even for lower frequency applications.

BRIEF SUMMARY OF THE INVENTION

The present invention proposes to reduce the unwanted inductive component of a wound capacitor by performing the first half of the winding in a first direction, interrupting the process to reverse the direction, and completing the winding in the reverse direction. The resulting inductive components of the structure thus oppose and effectively cancel one another, so that the unit is a more nearly perfect capacitor.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

DESCRIPTION OF THE DRAWING

In the drawing, in which like reference numerals identify corresponding parts throughout the several views.

DESCRIPTION OF THE PREFERRED EMBODIMENT

Figure 1:
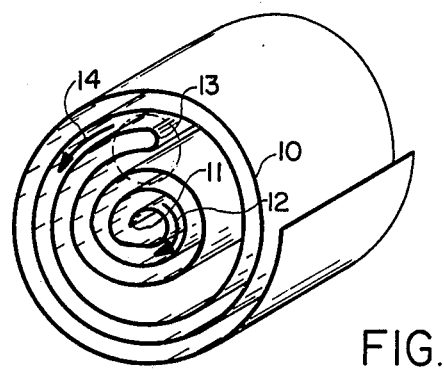
FIG. 1 is a schematic representation in end view of a simplified capacitor according to the invention.

In FIG. 1 the single line 10 represents a laminate of two layers of plastic such as polycarbonate, each having on one surface a strip or deposit of metal, the layers being apposed so that the metal of one engages the plastic of the other. The laminate is wound on an arbor, now shown, beginning at one end 11, and proceeding in the direction of the arrow 12 until about half the intended length of the laminate has been wound. Here, the winding is interrupted and the laminate is folded on itself at an angle of 180°, as at 13 in FIG. 1; then the winding direction is reversed and the winding is continued in the reverse direction, indicated by arrow 14, until the desired length has all been wound, when the end is taped as customary. If desired a tape may also be provided at fold 13, as will be discussed in connection with FIG. 2. In FIG. 1 a space has been shown between the successive convolutions of the laminate, although in fact such spacing is not desirable and the winding is tight enough to prevent it.

Figure 2:
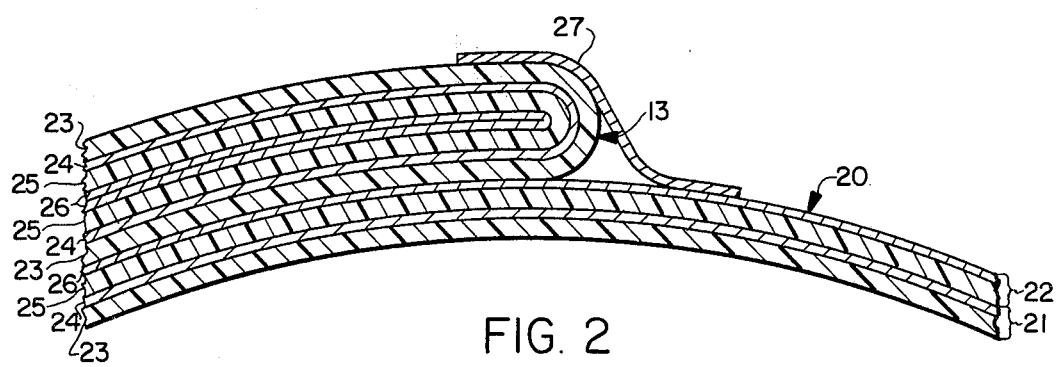
FIG. 2 is a greatly magnified end view of the portion of a capacitor identified by the broken line circle in FIG. 1.

Turning now to FIG. 2, laminate 20 is shown to comprise an inner layer 21 and an outer layer 22; the former comprises a dielectric layer 23 and a metalic layer 24, and the latter comprises the dielectric layer 25 and a metalic layer 26. At fold 13 layer 23 is outermost, and layer 26 is innermost. After the fold is made a tape 27 may be secured at the fold to layer 23 and before the fold to layer 22, as shown, to prevent unwinding of the first winding when the direction of the winding is reversed.

The capacitance of a capacitor is determined by the electrode area and the thickness and dielectric constant of the dielectric material between the electrodes. For a known thickness of material of known dielectric constance, the electrode area for a desired capacitance may be computed, and if the width of the apposed electrodes is known, the necessary length may be determined.

To make a capacitor according to the invention, first ends of a pair of layers, having a known dielectric constant, dielectric thickness, and electrode width, are apposed and secured to a winding mandrel; this can usually be accomplished without taping, the plastic adhering sufficiently well for the few instants necessary to build up a small number of wraps which will then hold the ends sufficiently against the mandrel. Winding proceeds until about half of the computed length has been wound, as determined for example by a footage counter, and then winding is temporarily terminated. A fold 13 of 180° is formed in the layers of the laminate, and the direction of winding is reversed. A tape 27 may be applied to hold the fold and prevent unwinding; under some conditions winding in the opposite direction may be done slowly enough to form one or two wraps which will then hold the fold in place. Thereafter the winding is completed, and the winding is taped externally to prevent unwinding.

From the above it will be evident that the invention comprises a capacitor, and a capacitor making method, in which the unwanted inductive component is reduced to a minimum by reversing the direction of winding of a wound capacitor when about half of the strip length has been wound.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

The embodiments of the invention in which an exclusive property or right is claimed are defined as follows:

1. The method of making a convolutely wound electrical capacitor, from a pair of layers of dielectric film coated on first faces with conductive material, which comprises the steps of:
   (a) superposing first ends of said layers so that the conductive surface of one engages the dielectric surface of the other;
   (b) securing said first end temporarily to a winding mandrel;
   (c) winding said layers simultaneously around said mandrel in a first direction until substantially half of a desired length has been wound;
   (d) interrupting the winding;
   (e) folding the layers through 180° along a line parallel to the winding axis;
   (f) securing the fold to the windings previously formed;
   (g) reversing the direction of winding;
   (h) winding the remaining desired length in the reverse direction; and
   (i) securing the ends of the layers to the winding previously formed.

2. The method of making a convolutely wound electrical capacitor from layers of dielectric film coated on first faces with conductive material, which comprises the steps of:
   (a) apposing first ends of said layers so that the conductive surface of one layer engages the dielectric surface of the other layer;
   (b) securing said first end to a winding mandrel;
   (c) winding said layers about said mandrel in a first direction to a desired length;
   (d) reversing the direction of the winding; and
   (e) completing the winding to a second length substantially equal to the first length, in said reverse direction.

3. Method of making a convolutely wound electrical capacitor which comprises performing half the winding in a first direction, then reversing the direction and completing the winding without allowing the first winding to unwind.

4. A convolutely wound electrical capacitor having alternate laminae of dielectric and conductive material, the laminae being folded and the direction of winding reversed when about half the desired length has been wound.

5. A capacitor according to claim 4 in which the conductive material extends to only first, opposite edges of the dielectric webs, and electrical connections are made to the conductive strips at the ends of the capacitor along substantially the entire length of the webs.

* * * * *